Oct. 21, 1969    H. P. ELKJAER    3,473,794
SYSTEM AND METHOD OF PRODUCING CEMENT CLINKER
Filed Sept. 29, 1967    4 Sheets-Sheet 2
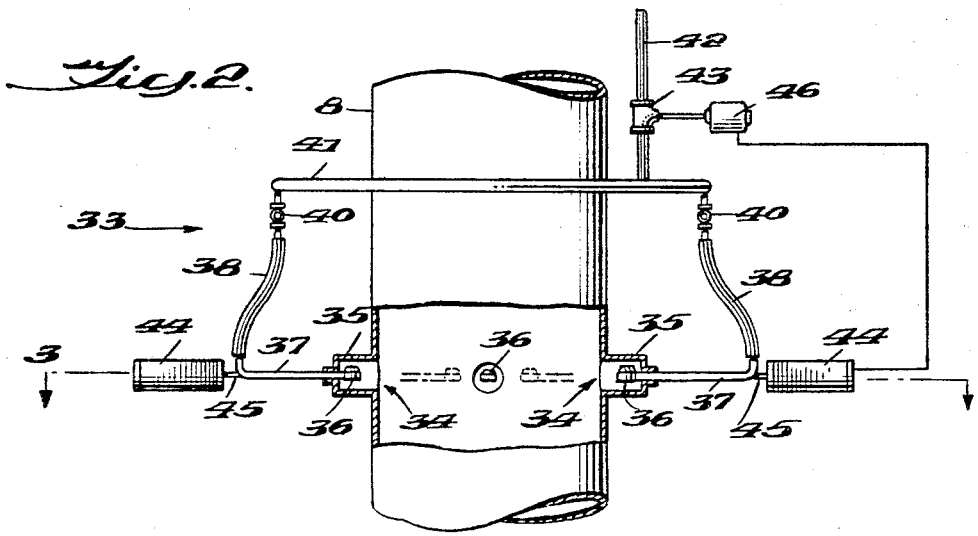
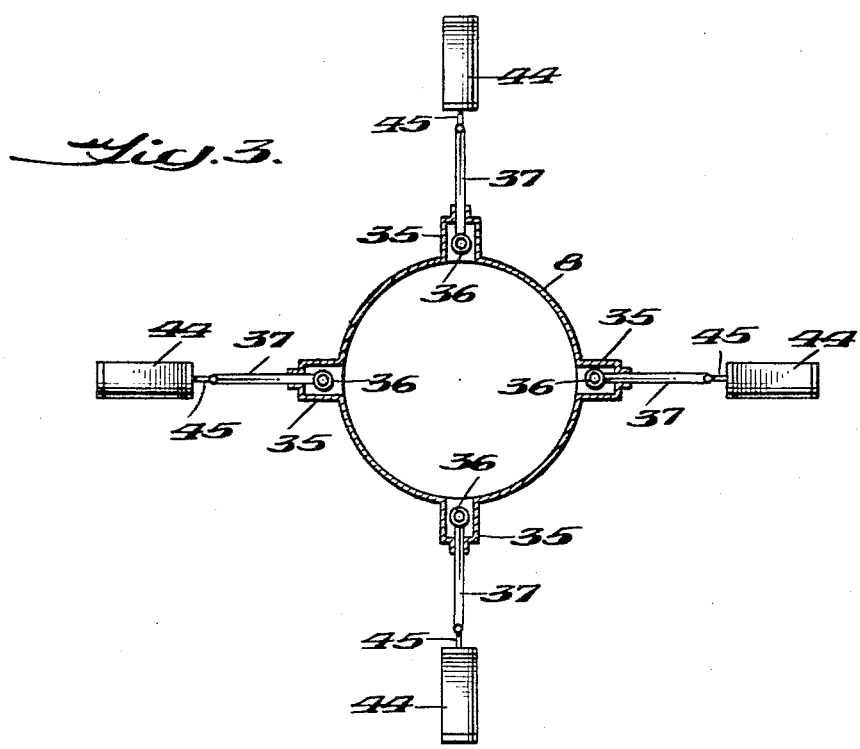
INVENTOR
HANS PETER ELKJAER,
BY
ATTORNEYS Oct. 21, 1969     H. P. ELKJAER     3,473,794
SYSTEM AND METHOD OF PRODUCING CEMENT CLINKER
Filed Sept. 29, 1967     4 Sheets-Sheet 3

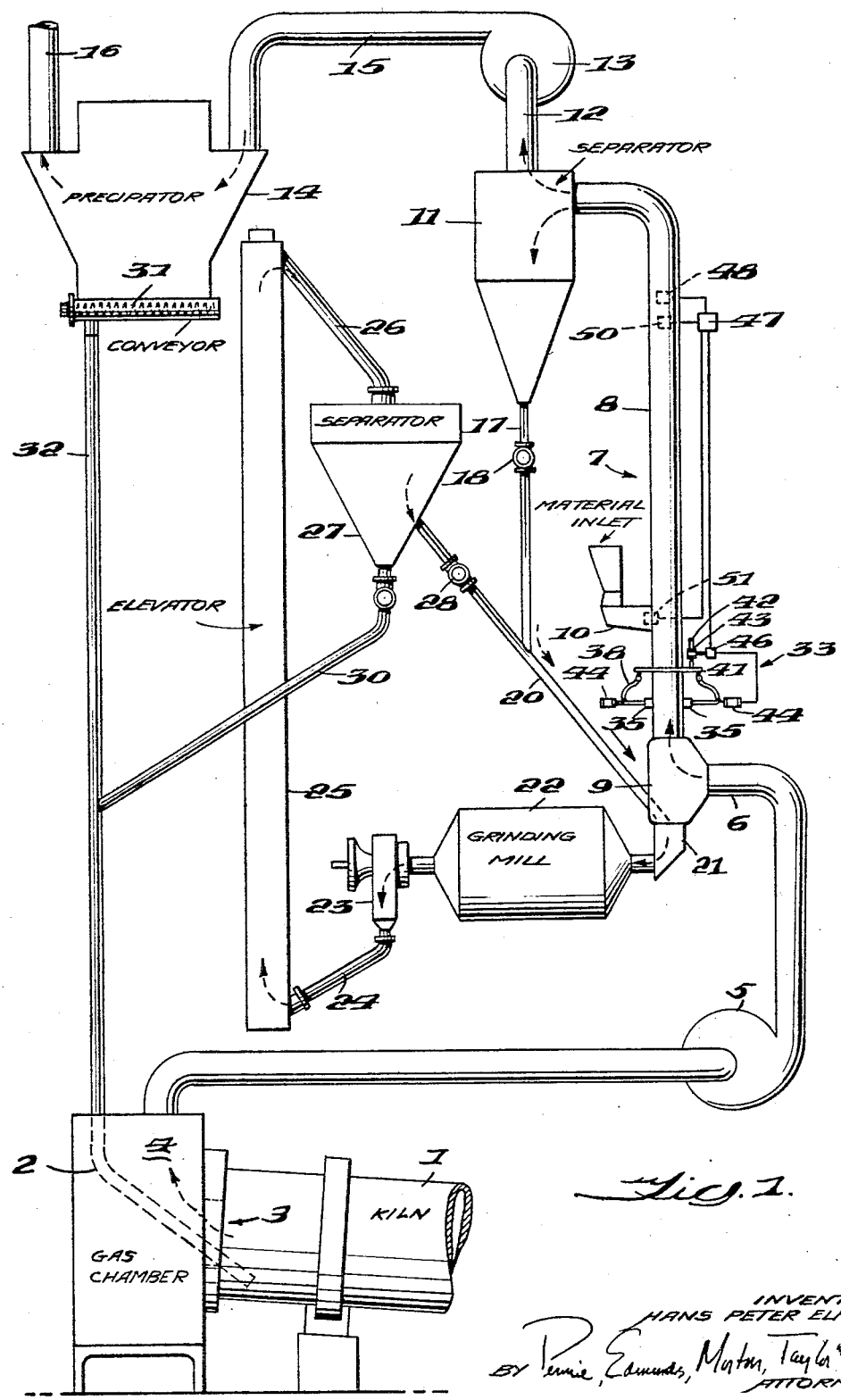

INVENTOR
HANS PETER ELKJAER,
BY
ATTORNEYS

United States Patent Office 3,473,794
Patented Oct. 21, 1969

3,473,794
SYSTEM AND METHOD OF PRODUCING
CEMENT CLINKER
Hans P. Elkjaer, Valby-Copenhagen, Denmark, assignor to F. L. Smidth & Co., New York, N.Y., a corporation of Delaware
Filed Sept. 29, 1967, Ser. No. 671,753
Claims priority, application Great Britain, Jan. 10, 1967, 1,112/66, 1,183/67
Int. Cl. F27b 7/00; C04b 1/00, 7/44
U.S. Cl. 263—32                                    32 Claims

ABSTRACT OF THE DISCLOSURE

A system for producing cement clinker from moist raw material including flash-drying unground raw material in hot waste gas from the kiln prior to grinding. A cooling medium is sprayed in contact with the drying material to control the physical conditions of the gas and raw material subsequent to the grinding of the raw material.

BACKGROUND OF THE INVENTION

In the production of cement by the dry method, cement raw materials are normally first crushed and mixed to produce a raw material which has to be ground in a mill before it can be fed as raw meal to a rotary kiln for burning. The raw material is normally moist, and the common practice is to dry it while it is being ground by passing hot air through the grinding mill. However, it has been found that, due to the variations in the moisture content of the cement raw material, as well as the sometimes excessively high moisture percentage of the raw material, either of two extreme conditions might easily become prevalent. Firstly, the raw material in the grinder would become overheated in the grinding mill or, secondly, the moisture from the raw material might not be all removed from the moist raw material. The presence of these two extreme conditions would retard the operative function of the grinding mill and seriously affect the overall operation of the cement producing system.

SUMMARY OF THE INVENTION

According to this invention, an unground cement raw material is first flash-dried in a riser pipe by the use of hot waste gas from a kiln and, after being separated from the gas, is ground in a grinding mill to be finally introduced in a cement kiln for burning to cement clinker. This invention enables adequate drying of the moist raw material to be effected, simply and efficiently prior to any grinding, even if very moist cement raw material is used as the raw material feed.

This invention also contemplates a system for producing cement clinker from cement raw material comprising, in combination, at least one kiln; a flash-dryer including a riser pipe; a means for introducing raw material into the riser pipe; means for leading hot waste gas from the kiln into the riser pipe to entrain the raw material for passage through the riser pipe and to dry the raw material; a separator positioned for separating the dried raw material from the gas leaving the riser pipe; a grinding mill; means for passing the dried raw material to the grinding mill; and means for feeding the ground dried raw material from the grinding mill to the kiln.

Further, this invention concerns a cement producing system whereby the physical conditions of the raw material and the kiln waste gas within the flash-dryer are regulated and controlled to thereby increase the overall efficiency of the system.

More particularly, this invention includes the provision of a novel flash-dryer for drying moist granular material comprising an upstanding riser pipe; means for introducing a moist raw material into the riser pipe; means for routing hot gas from the kiln into the riser pipe to flow therethrough and entrain the raw material; an outlet for the hot gas and raw material; and means for spraying a cooling medium either continuously or intermittently into the riser pipe to contact both the hot gas and the raw material. Additionally, the flash-dryer could include a means responsive to the physical conditions in the riser pipe for varying the flow rate of the cooling medium through the sprayer.

In such a system, it will be evident that the control of the cooling medium flowing into the riser pipe can be automatic. Specifically, the means responsive to the physical conditions in the riser pipe may comprise a device which is responsive to the rate of feed of the raw material to the riser pipe, responsive to the moisture content or humidity of the gas in the riser pipe, or responsive to the temperature located within the riser pipe. All these devices may be either singly or in combination responsive to provide a signal which is integrated to operate and control the flow rate of cooling medium passing through the sprayer.

Since the waste gas from the kiln is used to preheat the moist raw material prior to its grinding, the volume of the gas entering the riser pipe and its temperature are determined by the operation of the kiln and thus they may not be set to correspond to the amount of raw material per unit of time entering the system, or its moisture content.

Therefore, without some means to regulate the physical conditions of the recycled kiln gas or the raw material entering the grinding mill, other equipment in the system might become damaged. For example, a dust collector might work satisfactorily for a given rate of feed of cement raw material; however, if the rate of feed should decrease or the moisture content of the material should be reduced, the temperature of the effluent gas passing from the kiln through the riser pipe would rise, and its moisture content would decrease to such an extent that the dust filter, positioned intermediate the riser pipe and grinding mill, would become damaged. Further, the resulting temperature of the dried cement raw material may be, in such circumstances, too high for subsequent grinding in the mill with the result that clogging in the mill would appear. It might be well to point out that increases in the temperature of the gas in the riser pipe will have the same effect on the filter and grinding mill operation as decreases in the rate of feed or reduction of the moisture content of the material above mentioned.

Thus, when a flash-dryer, used in the cement system, has been operating satisfactorily for some time, a state of equilibrium of the temperature and moisture content of the gas is attained in the riser pipe. If then, for some reason, the supply of material to the riser pipe ceases completely, this equilibrium will be disturbed due to the instantaneous rise in temperature of the gas. When the supply of raw material to the riser pipe is resumed, the flash-dryer will not immediately operate satisfactorily until the equilibrium is restored. This may well take some time. Until this occurs. the quality of the final product will fall short of the standard set by the results obtained under normal operating condition. Further, the flash-dryer and other equipment, coupled to the dryer, might also be damaged.

Interruption of the supply of cement raw materials may not be due to any operational trouble. It is a common practice in cement producing works to suspend the operation of the raw material department every weekend, whereas the rotary kilns and filter are usually operated continuously. Accordingly, in order to prevent damage to the filter and to obtain a desirable product for grinding, the physical condition of the gas existing from the kiln is easily controlled by the use of this invention.

BRIEF DESCRIPTION OF THE DRAWINGS

FIG. 1 is a schematic view of the system for producing cement;

FIG. 2 is a view, partly in section, of a portion of the flash-dryer;

FIG. 3 is a view taken along lines 3—3 of FIG. 2;

DESCRIPTION OF THE PREFERRED EMBODIMENTS

Figure 4:
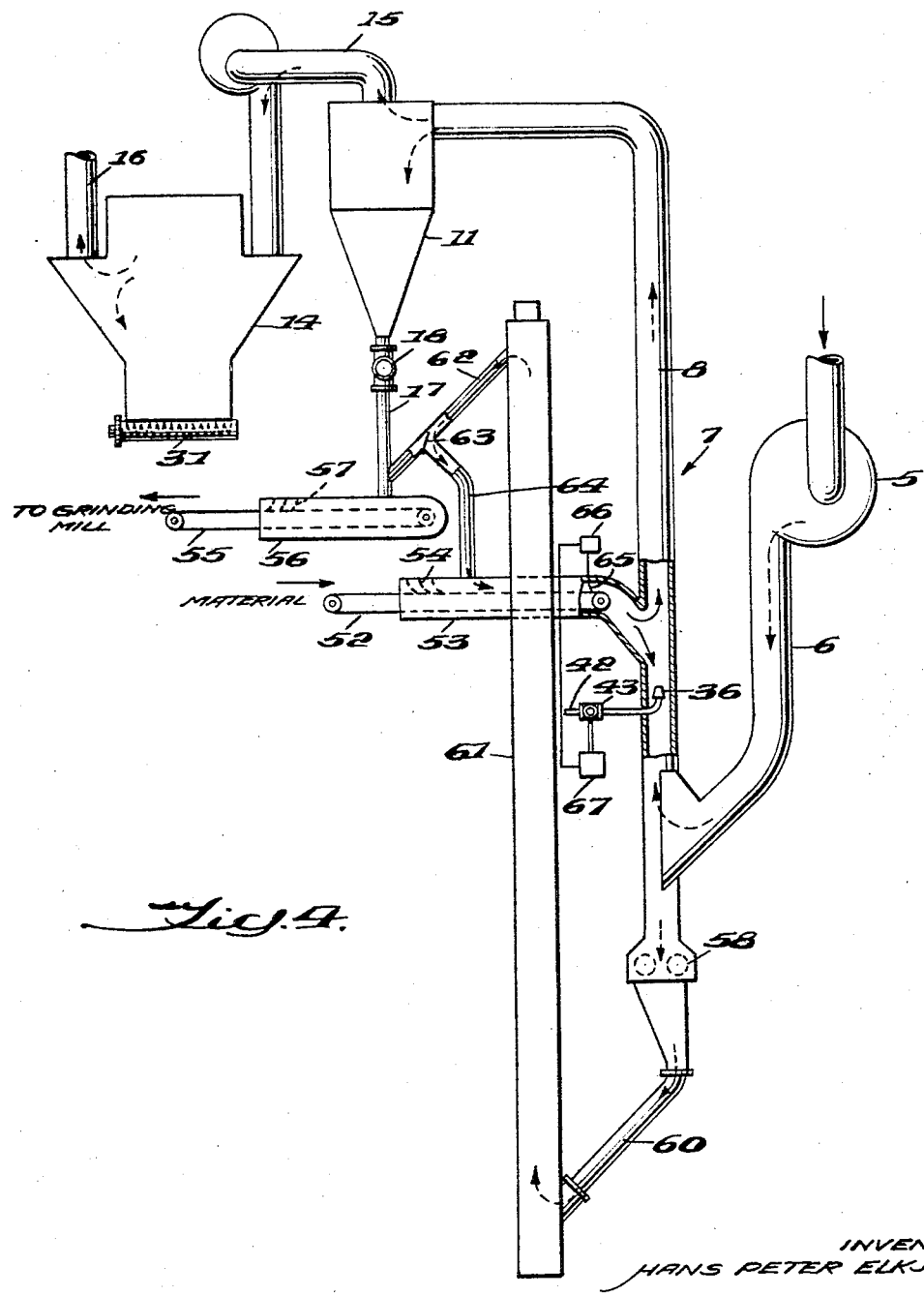
FIG. 4 is a schematic view of a modified form of the invention.

In the system for producing cement there is illustrated in FIG. 1 a rotating kiln 1 having raw material feed inlet conduit 2 of a gas outlet 3. The gas outlet 3 communicates with a waste gas chamber 4. A fan 5, positioned above the waste gas chamber 4, draws hot dust-laden gas from the rotary kiln 1 through the waste gas chamber 4 and blows the gas through a communicating conduit 6 and up into the lower end of a flash-dryer, generally indicated by 7, which comprises a vertical riser pipe 8 positioned above the kiln 1.

The riser pipe 8 also carries a material inlet 10 through which moist cement raw material is introduced into the riser pipe 8.

The flash-dryer may be fed with raw material of a grain size up to 25 mm. or even 40 mm. in diameter. however, only particles of less than 6 mm. are entrained by the upwardly flowing waste gas from the kiln and subjected to actual flash-drying. Larger particles collect at the bottom of the riser pipe 8 and are not subjected to any appreciable drying. The fact that the larger particles are not subjected to any appreciable drying is of a little importance since these particles are usually harder and less porous than the smaller ones and thus carry only surface moisture. The large particles may be either removed from the system or advantageously passed directly to the grinding mill through conduit 9 for recyclization through the system.

The upper end of the riser pipe 8 communicates with a cyclone separator 11 which separates the upwardly flowing gas and dried raw material such that the separated gas is removed from the separator through conduit 12 by blower 13 and is distributed to a precipitator 14 by passage through conduit 15.

The precipitator 14 is preferably an electrostatic precipitator which removes any dust from the gas before the gas is passed to the atmosphere through atmosphere outlet 16.

The solid dried raw material separated in the separator 11 falls by gravity through a conduit 17 past a gate valve 18 and into a second conduit 20 connected in series. This raw material continues to flow by gravity into a supply chamber 21 and finally into a grinding mill 22.

After the raw material has been subjected to the action of the grinding mill 22, it is removed through discharge hopper 23 for passage via conduit 24 to the bottom end of a conventional material elevator 25. This elevator transports the raw ground material to a point above the grinding mill 22 and conveys the material to conduit 26 through which the raw material flows by gravity to a second separator 27. The separator 27 divides the ground material into two fractions, according to particle size. The coarse fraction is discharged through a conduit 20 which communicates with the grinding mill 22. A rotary valve 28 is provided in the conduit 20 and performs the same function as the gate valve 18 in conduit 17.

The fine fractions from the separator 27 leave through the bottom through conduit 30 and pass to the feed inlet 2 of the kiln 1 for burning into cement clinker.

The dust precipitated in the electrostatic precipitator 14 accumulates at the bottom and is removed by means of a worm conveyor 31. This dust is carried away through pipe 32 and is mixed with the fine fraction from the separator 27 to form part of the kiln feed.

The flash-dryer 7 is also provided with a spraying assembly, generally indicated by 33, and more clearly seen in FIG. 2. The spray assembly 33 is positioned downstream of the raw material feed inlet 10. At this point, the riser pipe 8 also carries a plurality of apertures 34 arranged around its periphery. Each aperture communicates with a nozzle casing 35 which is secured to the outside of the riser pipe 8. Each nozzle casing 35 houses a nozzle 36 which is connected to one end of L-shaped pipe 37 that is slidably secured to extend within the nozzle casing 35. The other end of each pipe 37 communicates, by means of a resilient hose 38, through central valves 40 to a header ring pipe 41. A supply pipe 42, having a valve 43, supplies cooling medium, such as water, to the header ring pipe 41 from a supply source (not shown). Therefore, the supply pipe transports the cooling medium by way of the above-mentioned intermediate connections to the nozzles 36.

The nozzles 36, in their normal position, are resiliently held within the nozzle casings 35 by the action of the resilient hose 38 but they are adapted to be moved from within the nozzle casings 35 to a point within the riser pipe 8 by means of solenoids 44 and rods 45. When the solenoids 44 are activated, the rods 45 move against the L-shaped pipe 37, pushing the L-shaped pipe 37 and nozzles 36 inwardly into the riser pipe 8. The solenoids 44 are electrically connected to a control mechanism 46, such as a motor, which is designed to operate valve 43 for controlling the amount of cooling medium flowing to the nozzles 36.

The control mechanism 46, in turn, is electrically connected through electrical gate or switch 47 to a temperature-sensitive device 48 and to a moisture-sensitive device 50, both located within the riser pipe upstream of the raw material inlet 10, and to a raw material flow-sensitive device 51, positioned at the raw material inlet 10. The temperature-sensitive device 48 and the moisture-sensitive device 50 may be a thermocouple or a hygrometer, respectively, while the material flow-sensitive device 51 may be a flow meter.

It is to be understood that any known instruments which may sense temperature or humidity changes within a gas stream, or sense rate changes of material flow, are deemed to be within the scope of this invention. Further, this invention also contemplates the use of each particular sensing device alone, or the use of any combination of the sensing devices above-mentioned.

The operation of the spray assembly of the flash-dryer may be set forth as follows.

The cooling medium that is sprayed into the riser pipe 8 is supplied through supply pipe 42 to the nozzles 36. The nozzles 36 are ordinarily positioned downstream of the point at which the raw material is fed into the riser pipe 8 but, in any given system, the best position is determined by experimentation.

The spraying of the cooling medium is controlled in accordance with the rate of raw material passing through the raw material inlet, the temperature of the upwardly flowing gas within the riser pipe and for the humidity of the flowing gas.

Therefore, when the temperature or humidity of the gas being sensed by the temperature-sensitive device 48 and the moisture-sensitive device 50 exceeds a predetermined and set range for the proper and desirable operation of the system, or if the rate of flow of raw material into the riser pipe 8 being sensed by the flow-sensitive device 51 goes below a predetermined value, each respective sensing device signals the electrical gate 47 which, in turn, integrates the signal for controlling the valve 43 through control mechanism 46. The control mechanism 46 operates to open the valve 43 which either starts the flow of cooling medium to the nozzles 36 or merely increases the flow of cooling medium thereto.

Thus, it can be seen that, depending upon the physical condition which may exist within the riser pipe, the amount of cooling medium passing through the nozzles and into the riser pipe is controlled. Further, if more than one physical condition varies simultaneously, the flow of cooling medium may be controlled by the combined effect of the variations.

Nozzles 36 lying in the stream of flow of the dust-laden kiln waste gas are, of course, subjected to considerable wear and should be made of abrasion-resistant metal. However, the nozzles 36 may be housed in the nozzle casings 35 permanently, thus shielding the nozzles from the gas stream at all times. In this form of the invention, the ends of the nozzles are so constructed that the cooling medium is directed horizontally into the riser pipe rather than vertically.

In one form of the invention, valve 43 may be a shut-off valve which is either fully open or fully closed. On the other hand, regulation of the amount of cooling medium being sprayed through the nozzles may be effected in various ways. Firstly, one or more intermediate valves 43 may be closed, thereby reducing the number of nozzles in operation. Further, the pressure of the supply source which passes the cooling medium to the supply pipe may be varied. Thirdly, valve 43 may itself be a regulating valve, opening and closing in degree in accordance with the degree of changes in the physical conditions within the riser pipe 8.

The cement producing system, as illustrated in FIG. 4, is similar to that of FIG. 1 and is constructed to operate on particles which exceed 25 mm. in diameter. In this embodiment, fan 5 draws hot waste gas from a kiln, not shown, and blows the gas through conduit 6 into the lower end of the riser pipe 8.

The moist cement raw material to be dried is fed to the riser pipe 8 by a conveyor 52, driven by a motor (not shown). The conveyor 52 is surrounded at one end by a casing 53 that opens into the riser pipe 8. Near the open end of the casing 53 there are arranged several flexible plates 54 under which raw material on the conveyor passes. These flexible plates 54 are arranged to prevent atmospheric air from entering the casing 53 and hence into the riser pipe 8 with the raw material.

The cement raw material entering the riser pipe 8 is entrained by the hot waste gas from the kiln and dried as it is carried to the separator 11. The separated, dried material is discharged through conduit 17 having a gate valve 18 which prevents atmospheric air from entering the separator 11. The dried material continues to flow by gravity through conduit 17 to a second conveyor 55 surrounded by a casing 56. The conveyor 55 transports the raw material to the grinding mill (not shown) for eventual conveyance to the kiln or, alternatively, to the storage. Flexible plates 57 are also arranged within the casing to prevent atmospheric air from being sucked into the casing 56.

Only particles of raw material up to about 6 mm. in size are entrained by the hot waste gas flowing upwardly through the riser pipe 8. Larger particles fall downwardly in the riser pipe and are reduced in size by crusher 58, positioned below the riser pipe 8. The crushed raw material then passes through pipe 60 to the bottom of a vertical elevator 61 which lifts it and discharges it into a downwardly inclined pipe 62. A diverter valve 63 is provided in pipe 62 to divert the smaller raw material particles from pipe 62 through connecting pipe 64 which opens into the casing 53 for recycling back into the flash-dryer 7. Alternatively, the diverter valve 63 may allow the larger raw material particles to pass through the pipe 62 to be conveyed into the casing 56 onto the conveyor 55.

The cooling medium that is sprayed into the riser pipe 8 is supplied through supply pipe 42, whose flow is controlled by valve 43 to the nozzle 36. In this embodiment, the spraying of the cooling medium is controlled in accordance with only the rate of feed of the raw material.

In this arrangement, an elongated feeler 65 is hinged on the roof of the casing 53 to extend toward the moving conveyor 52 such that (1) it normally rests on the surface of the moving material carried on the conveyor 52; and (2) it rotates about its hinged attachment to rest on the conveyor surface itself when the supply of material to the conveyor ceases.

The hinged feeler 65 is connected to an electrical gate or switch 66 which is adapted to send a signal to a control mechanism 67 to actuate the valve 43 in the supply pipe 42. Thus, when the flow of raw material ceases, the feeler 65 rotates downwardly into contact with the surface of the conveyor 52. This movement of the feeler 65 sends a signal to electrical gate 66 which integrates the signal and actuates the control mechanism 67 to open the valve 43 and thus allow more cooling medium to be sprayed into the riser pipe 8. When the supply of raw material is resumed, or the rate of feed returns to normal, the feeler 65 resumes its normal position and the valve 43 may be a regulating valve which operates in accordance Various modifications in this embodiment may also be made by enabling the flow of cooling medium through the pipe 42 to be automatically regulated. Thus, the valve 43 may be regulating valve which operates in accordance with the degree of movement of the feeler 65.

If sufficient water cannot be supplied through the single nozzle shown in this embodiment, a group of two or more nozzles may be used, as illustrated in FIG. 2.

Figure 5:
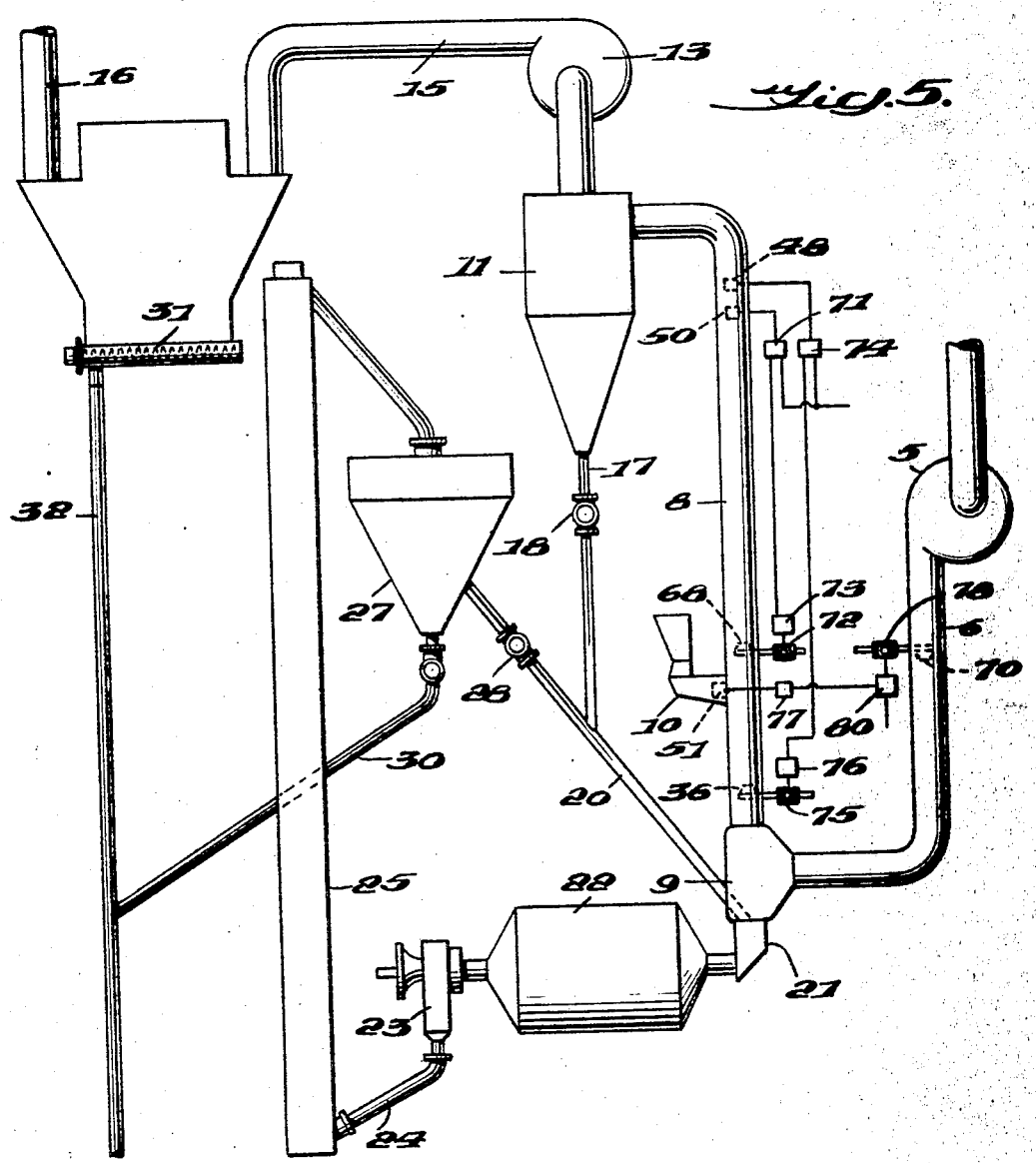
FIG. 5 is a schematic view of still another form of the invention.

The modification of FIG. 5 is constructed to dry moist raw material particles that do not exceed 25 mm. in diameter. The only difference between this modification and that illustrated in FIG. 1 is the spraying assembly 33.

In addition to positioning a nozzle 36 below the raw material inlet 10, this embodiment carries a nozzle 68 positioned above the raw material inlet 10 and a nozzle 70 situated within a vertical conduit 6 which communicates at one end with the riser pipe 8 and at the other end with the fan 5. Alternatively, the nozzle 70 may be placed in the riser pipe 8 along with nozzles 68 and 36. While the fan 5 is located at least above the junction between conduit 6 and riser pipe 8, nozzles 36, 68 and 70 are all positioned to direct the spray of cooling medium in the same direction as the flow of gas through conduit 6 and riser pipe 8.

The moisture-sensitive device 50 in the upper end of the riser pipe 8 is coupled to an electrical gate 71 which actuates the upper valve 72 of the nozzle 68 through control mechanism 73, whereas the temperature-sensitive device 48 is independently connected to a separate electrical gate 74 for actuating the valve 75 of the lower nozzle 36 through control mechanism 76. Likewise, the material flow-sensitive device 51, arranged at the material inlet 10, is connected in series to an electrical gate 77 for controlling the valve 78 of nozzle 70 through control mechanism 80. As it can be seen, all nozzles 36, 68 and 70 act independently of each other since they are connected to separate circuit systems. This invention also contemplates an arrangement whereby a desired amount of cooling medium may be conveyed to each nozzle 36, 68 and 70 in accordance with the combined measurements of moisture-sensitive device 50, temperature-sensitive device 48 and the material flow-sensitive device 51.

Having nozzles placed at various heights in the riser pipe advantageously allows the interior of the riser pipe to be subjected to a uniform spray along a greater length of the riser pipe.

It might be thought that the addition of water, as a cooling medium, would cause problems since it is known that dust-laden gas and fine streams of water are somewhat incompatible. It would be expected that the riser pipe would thus become clogged, thereby impeding the gas flow. Such gradually increased clogging may occur in the periods when the supply of material is interrupted, but it is found that when the supply of raw material is resumed the clogging and any blockage are removed immediately by the abrasive effect of the solid particles carried by the waste gas.

Having thus described the invention with particular reference to the preferred forms thereof, it will be obvious to those skilled in the art to which this invention pertains, after understanding the invention, that various changes and modifications may be made therein without departing from the spirit and scope of the invention.

I claim:

1. A system for producing cement clinker from unground moist raw material comprising a kiln; a flash-dryer including a riser pipe; means for introducing raw material into the riser pipe; means for leading hot waste gas from the kiln into the riser pipe to entrain the raw material for passage through the riser pipe and to dry the raw material; a separator positioned for separating dried raw material from the gas leaving the riser pipe; a grinding mill; means for passing the dried raw material to the grinding mill; and means for feeding ground dried raw material from the grinding mill to the kiln.

2. The system of claim 1 in which the riser pipe is mounted directly above the inlet to the grinding mill and means is included for passing directly by gravity to the grinding mill any raw material not entrained in the gas stream.

3. A system for producing cement clinker from raw material comprising a kiln; a grinding mill; means for routing the raw material from the grinding mill to the kiln; a riser pipe; a means for introducing the raw material to the riser pipe; means for routing hot gas from the kiln into the riser pipe to entrain the raw material; a separator positioned for separating raw material from the gas leaving the riser pipe; means for passing the separated and dried raw material to the grinding mill; sprayer means positioned within the riser pipe for introducing a cooling medium therein to contact with both the gas and the raw material passing through the riser pipe; and means for passing a cooling medium to said sprayer.

4. The system of claim 3 including a control means communicating with said sprayer for varying the flow of the cooling medium therethrough.

5. The system of claim 3 including a means responsive to the physical conditions in the riser pipe for varying the flow rate of the cooling medium through the sprayer.

6. A flash-dryer for drying moist granular material comprising an upstanding riser pipe; means for introducing hot gas into the riser pipe to flow therethrough and entrain the raw material; means for introducing a raw material into the riser pipe; an outlet for the hot gas and raw material; and means for spraying a cooling medium into the riser pipe to contact both the hot gas and the raw material.

7. The flash-dryer of claim 6 including a means responsive to the physical conditions in the riser pipe for varying the flow rate of the cooling medium through the sprayer.

8. A flash-dryer for drying moist granular material comprising a vertically arranged riser pipe; a hot gas inlet for said pipe arranged near the bottom of the riser pipe; a raw material inlet positioned in the riser pipe above the gas inlet; a gas-material outlet arranged in the riser pipe and situated above the gas and material inlets; a sprayer positioned to extend within the riser pipe; a source of cooling medium for said sprayer; control means communicating with said sprayer to vary the flow rate of cooling medium passing through the sprayer; and means responsive to the physical conditions in the pipe to operate said control means.

9. The flash-dryer of claim 8 wherein said responsive means includes a temperature-sensitive device positioned within the riser pipe upstream of the sprayer and means responsive to the temperature-sensitive device for providing a signal to operate said control means.

10. The flash-dryer of claim 8 wherein said responsive means includes a moisture-sensitive device positioned within the riser pipe upstream of the sprayer and means responsive to the moisture-sensitive device for providing a signal to operate said control means.

11. The flash-dryer of claim 8 wherein said responsive means includes a material flow-sensitive device positioned in the raw material inlet and means responsive to the material flow for providing a signal to operate said control means.

12. The flash-dryer of claim 8 wherein said sprayer comprises a nozzle.

13. The flash-dryer of claim 12 including means for retracting the nozzle out of the gas-material stream flowing through the riser pipe.

14. The flash-dryer of claim 13 in which the retracting means is actuated by a means responsive to the cessation of the flow of said cooling medium through the nozzle.

15. The flash-dryer of claim 12 wherein said riser pipe carries at least one aperture and at least one nozzle casing communicating with said aperture and the interior of the riser pipe, and means for retracting the nozzle from within the riser pipe to pass through said aperture and into the nozzle casing in response to the cessation of the flow of said cooling means through the nozzle.

16. The flash-dryer of claim 14 wherein said nozzle communicates through an intermediate pipe connection to said source of cooling medium.

17. The flash-dryer of claim 16 wherein the said pipe connection carries a valve operatively connected to said control means.

18. The flash-dryer of claim 17 wherein said pipe connection comprises an L-shaped pipe, a resilient hose, a header ring pipe and a supply pipe, said L-shaped pipe being connected at one end to the nozzle, and at the other end to said resilient hose, while said hose communicates with said supply pipe through the header ring.

19. The flash-dryer of claim 18 wherein said retracting means comprises a solenoid and an associated actuating rod acting against said L-shaped pipe.

20. The flash-dryer of claim 19 wherein there is included a plurality of nozzles arranged to extend within the riser pipe.

21. The flash-dryer of claim 10 wherein said moisture-sensitive device is a hygrostat.

22. The flash-dryer of claim 9 wherein said temperature-sensitive device is a thermocouple.

23. The flash-dryer of claim 11 wherein said temperature-sensitive device is a flow meter.

24. A method for producing cement from moist unground raw material comprising flash-drying unground cement raw material by entraining the raw material within hot waste gas from a kiln, separating the dried raw material from the gas; grinding the dried raw material in a grinding mill; feeding the ground raw material into a kiln; and burning the raw material in the kiln to form cement clinker.

25. The method of claim 24 wherein the raw material, not entrained in the gas stream, is passed directly by gravity to the grinding mill.

26. A method of producing cement clinker from moist raw material which comprises introducing the raw material into an upstanding riser pipe; introducing a hot stream of waste gas from a kiln upwardly into the riser pipe to entrain the raw material; spraying a cooling medium within the riser pipe into contact with the raw material and hot gas; separating the hot gas from the raw material; grinding the raw material; feeding the ground material into the kiln; and burning the ground material in a kiln.

27. The method of claim 26 including the step of controlling the amount of cooling medium sprayed into the riser pipe.

28. The method of claim 27 wherein the amount of cooling medium is controlled in response to the physical conditions within the riser pipe.

29. The method of claim 28 including the step of measuring the temperature of the gas in the riser pipe and controlling the rate of flow of the cooling medium into the riser pipe in accordance with the temperature measurement.

30. The method of claim 28 including the step of measuring the moisture of the gas in the riser pipe and controlling the rate of flow of the cooling medium into the riser pipe in accordance with the moisture measurement.

31. The method of claim 28 including the step of measuring the flow rate of raw material being introduced into the riser pipe and controlling the rate of flow of cooling medium into the riser pipe in accordance with the flow rate measurement.

32. The method of claim 26 wherein said cooling medium is water.

References Cited

UNITED STATES PATENTS 3,127,455   3/1964   Culbertson et al. _____ 263—53
3,203,681   8/1965   Rosa et al. _____ 263—32 X JOHN J. CAMBY, Primary Examiner U.S. Cl. X.R.

263—53

UNITED STATES PATENT OFFICE
CERTIFICATE OF CORRECTION

Patent No. 3,473,794          Dated Oct. 21, 1969

Inventor(s) Hans P. Elkjaer

It is certified that error appears in the above-identified patent and that said Letters Patent are hereby corrected as shown below:

| COLUMN | LINE | READS | SHOULD READ |
|---|---|---|---|
| 2 | 64 | Condition | Conditions |
| 3 | 3 | existing | exiting |
| 3 | 20 | of | and |
| 3 | 33 | howeverq | However |
| 3 | 39 | a | should be deleted |
| 4 | 38 | moisture-sensiive | moisture-sensitive |
| 6 | 23 | 43 may be a regulating valve which operates in accordance | 43 is closed through circui |
| 6 | 27 | may be regulating | may be a regulating |

SIGNED AND
SEALED
MAY 12 1970

(SEAL)
Attest:

Edward M. Fletcher, Jr.
Attesting Officer

WILLIAM E. SCHUYLER, JR.
Commissioner of Patents